March 12, 1963  J. E. SPURLING  3,080,751
MASS FLOW METER
Filed Feb. 9, 1960  4 Sheets-Sheet 1
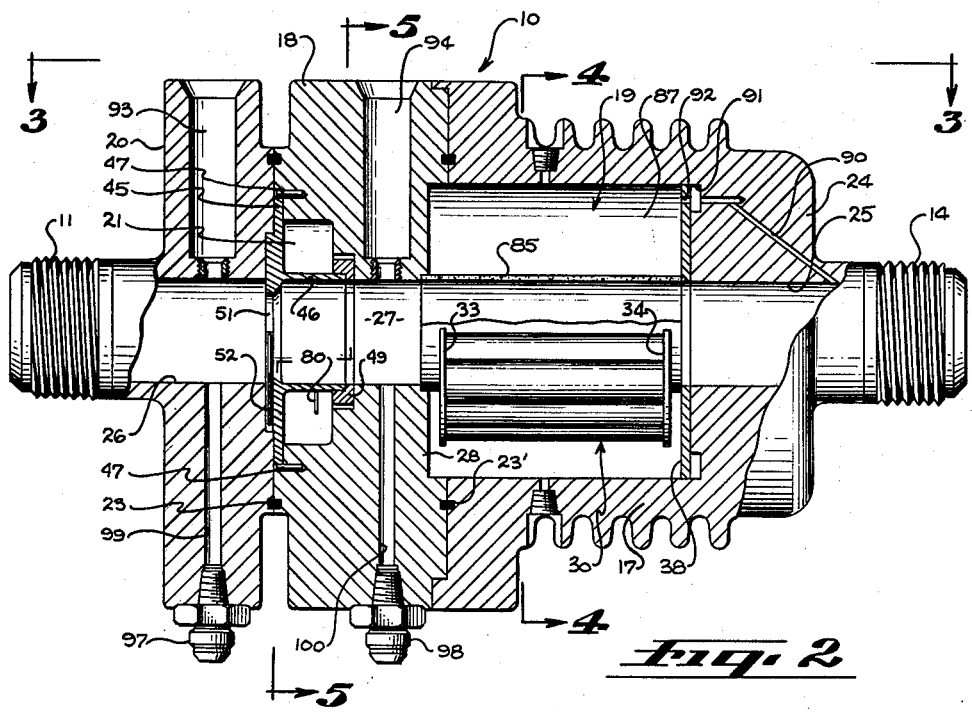
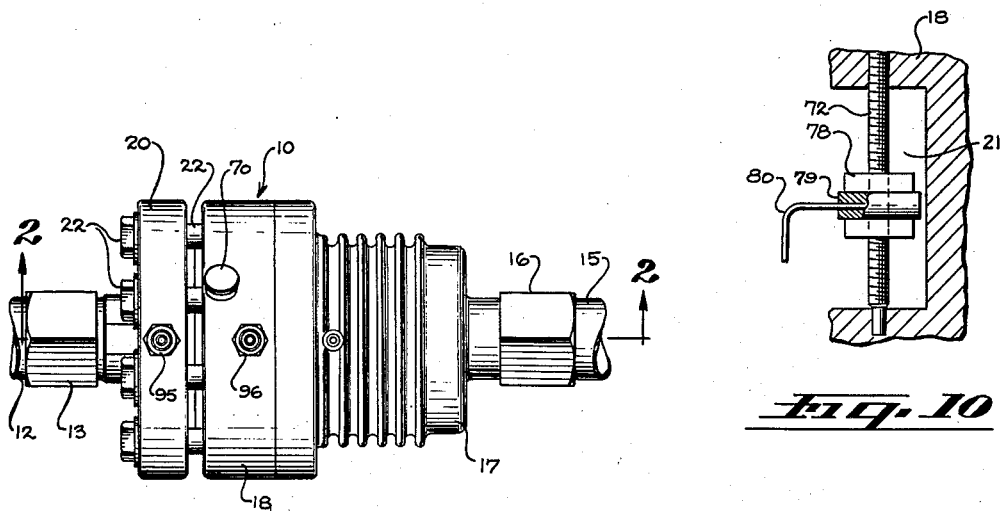
JOHN E. SPURLING
INVENTOR
BY
Beehler & Shanahan
ATTORNEYS

JOHN E. SPURLING
INVENTOR

March 12, 1963

J. E. SPURLING 3,080,751

MASS FLOW METER

Filed Feb. 9, 1960

JOHN E. SPURLING
INVENTOR

BY
Beehler & Shanahan
ATTORNEYS

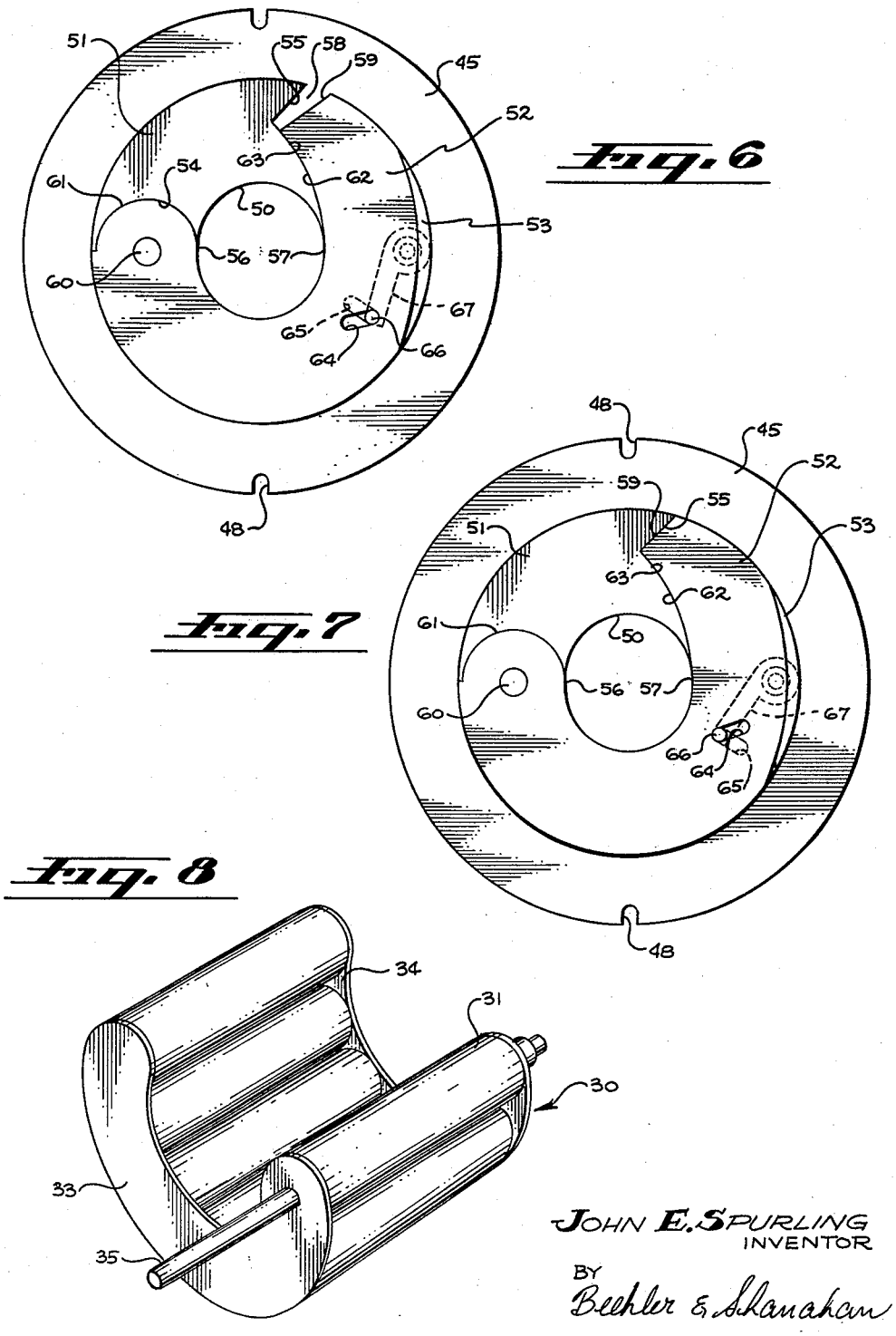

United States Patent Office 3,080,751
Patented Mar. 12, 1963

3,080,751
MASS FLOW METER
John E. Spurling, Encino, Calif., assignor to Millrich Engineering Co., a Division of Int'l Electronic Research Corp., Burbank, Calif., a corporation of California
Filed Feb. 9, 1960, Ser. No. 7,559
12 Claims. (Cl. 73—207)

The invention relates to fluid flow indicators and has particular reference to an instrument or measuring device which is placed in a fluid line, and particularly in a liquid line, which is capable of indicating the mass or weight of fluid passing through the instrument irrespective of the volume.

Although science and industry for the past decade or more has recognized and appreciated the need for measuring fluid and liquid quantities by mass, or by weight as that term is commonly used, the difficulties in providing suitable measuring means have heretofore exceeded the technology of those skilled in the art working on devices of this kind. A few attempts to work out mass flow metering devices have been made but these have resulted in no more than crude devices capable of making approximate mass flow determinations but without the dependability needed in industry. As a result, from ten to twenty years have passed without the mass flow measurement principle disclosed in such early devices being embodied in commercially operable instruments.

Such devices heretofore devised have failed to perform at high pressures and even at only moderate pressures due to failure in recognizing performance characteristics of fluids and liquids when passing obstructions in the meter. The result of prior designs has been the production of turbulence at the area of measurement so great that readings for the most part have been unusable for any of the moderately high pressures and temperature changes as well as moderate changes in specific gravity of the fluids. When made use of in the measurement of exotic fuels and cryogenic fluids, the flow passages previously designed have been productive of such an irregularity in the flow that no commercial use has been made of them. Where floats have been used, pressures encountered have caused collapse of the floats. Turbulence over irregular surfaces has produced eddies and disturbances in the flow with resulting harmful effects and undue wear upon the parts. The numerous parts proposed and their complicated movements have presented fabrication and servicing problems so great that use heretofore has been confined largely to experimental and development work where results are accepted only after careful and continued checking.

It is therefore among the objects of the invention to provide a new and improved mass flow meter of such construction that measurements and indications derived therefrom are of a precision character and dependable under a great variety of conditions.

Another object of the invention is to provide a new and improved mass flow measuring device or meter especially dependable under severe conditions and exacting demands as, for example, when moderate and high pressure rates and high flow rates are encountered in liquids, liquefied gases and fluids having unusual as well as customary characteristics.

Still another object of the invention is to provide a new and improved mass flow meter mechanism of such design and construction that turbulence therein is reduced to virtually a minimum and wherein moving parts of the device are sufficiently well shielded from conditions which might be set up in the path of flow that undue fluctuations and surging is reduced to virtually a minimum and so that true readings can be easily taken and depended upon.

Still another object of the invention is to provide a new and improved mass flow metering device which can be readily reset with respect to its zero or initial adjustment from the exterior in order to accommodate the device to a considerable variety of flow conditions as might result from a change in the fluid passing therethrough, change in pressure, specific gravity, temperature and such other factors as exist which, unless the device were adjustable, would necessitate either replacement of certain critical parts in the device or substitution of an entirely different device.

Still further among the objects of the invention is to provide a new and improved mass flow measuring mechanism relatively simple in its design and construction, thereby to improve the ease of initially calibrating the device as well as assuring constant dependable performance over long periods of time and also to provide a device which will operate dependably without attendance and checking, especially under conditions where conditions and circumstances outside of the mechanism are adverse and where the operation must be automatic and rapid.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a side elevational view of the flow meter embodying the invention.

FIGURE 2 is a longitudinal sectional view taken on the line 2—2 of FIGURE 1.

FIGURE 6 is an elevational view of the orifice plate in maximum open position of adjustment.

FIGURE 7 is a view similar to FIGURE 6 in minimum or contracted position.

FIGURE 8 is a side perspective view of the actuator embodied in a float.

FIGURE 10 is a fragmentary longitudinal sectional view taken on the line 10—10 of FIGURE 5.

Figure 3:
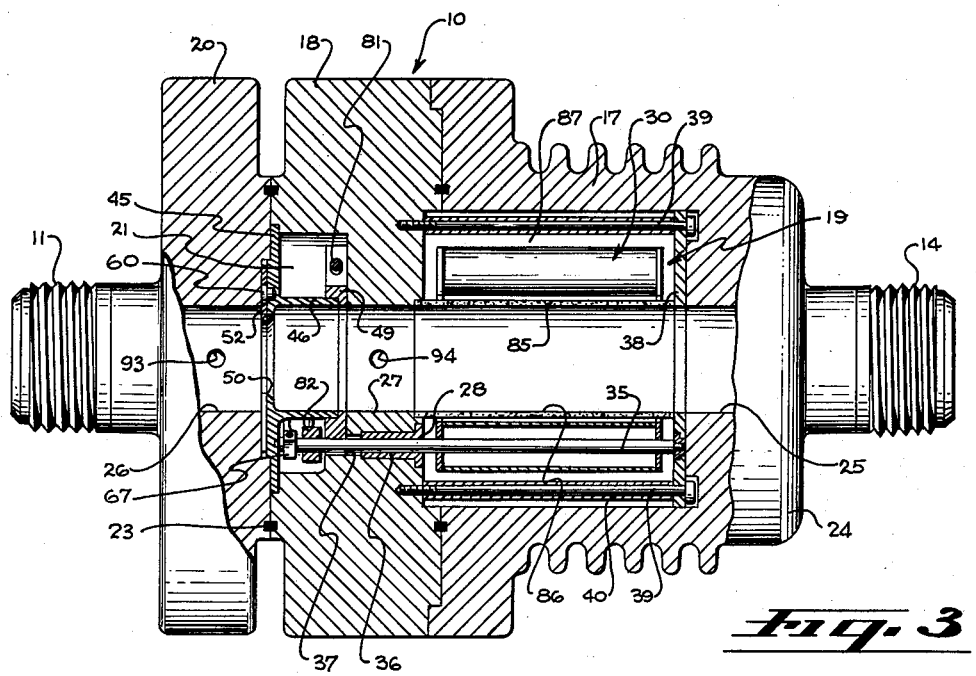
FIGURE 3 is a longitudinal plan view partially broken away viewed from the line 3—3 of FIGURE 2.

In industries which regularly handle liquids and especially fuels, the need for accurate measurements has become increasingly important. This applies to the filling of fuel tanks for storage in the field as well as the filling of fuel tanks on vehicles such as boats, trucks and airplanes, whether jet operated or combustion engine operated. The amount of energy and power available in fuels is dependent primarily upon the mass rather than the volume. Although volume is easy to measure, translating volume to mass cannot be done readily in the field. As an example, attention is directed to the fact that the mass of a hydrocarbon fuel may vary from ten to fifteen percent, depending upon the specific gravity of the fuel which may vary during the course of an hour's run or a day's run to a considerable degree. The mass and consequently power available in a hydrocarbon fuel may vary from two to seven or eight percent depending upon temperature changes between ordinary outside summer temperatures and winter temperatures down to zero degrees and lower. Similar temperature changes and consequent volume changes are also experienced in the fuel tanks of airplanes on the ground and when flying at altitudes of 30,000 feet and higher. Where the ability of an airplane to stay aloft depends upon the available fuel supply, it is obviously very important that the operator know precisely at any time the mass of fuel in the tanks irrespective of the volume. The same need for precise measurement exists in the handling of such materials as liquid oxygen and other liquefied gases. Storage tanks also for liquids and gases in great quantities must be such that the masses of liquids contained therein or to be added thereto can be measured accurately in order to get maximum use of the equipment without subjecting the equipment to dangerous overloads.

Although the invention hereinafter described has been related to but a single device of moderate size such as might be placed in a hydrocarbon line or even perhaps a liquid gas line of moderate capacity, the principles involved as embodied in the structure are equally applicable to widely different uses and the scope of the invention is commensurate with such uses.

In an embodiment of the invention chosen for the purpose of illustration the invention is shown incorporated in a mass flow meter capable of handling liquids under relatively high pressure where variations in density of the liquid may occur from time to time either as a result of variations in pressure or as a result in variations in temperature. The invention is contained within a housing indicated generally by the reference character 10 provided at the left end, as viewed in FIGURES 1 and 2, with an inlet connection 11 attaching a pipe 12 by means of a nut 13 and at the right end with an outlet connection 14 made to a pipe 15 by means of a nut 16.

More particularly the body is constructed of a finned section 17 and an intermediate section 18 which together enclose a chamber 19. An end section 20 in cooperation with the intermediate section encloses an orifice recess 21. These sections are secured together by appropriate studs 22 with joints sealed by means of seal rings 23 and 23'.

At the outlet end of the finned section is an end wall 24 through which passes a central outlet passage 25. An axial bore 26 extends through the end section 20 which may be appropriately designated a cover fitting and communicates with an inlet passage 27 in a partition wall 28 forming part of the intermediate section 18.

The Actuator Mechanism

Figure 4:
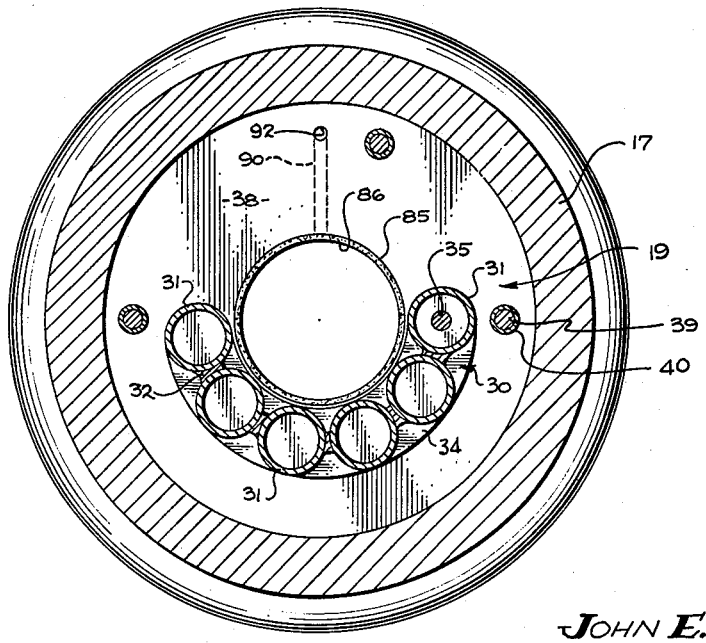
FIGURE 4 is a cross-sectional view taken on the line 4—4 of FIGURE 2.

In the embodiment chosen for the purpose of illustration it may be assumed that the mass flow meter is arranged to accommodate a fluid in liquid form wherein changes in desity, whether arising from changes in pressure or changes in temperature, may be captured and measured by use of a submerged float 30 shown located in the chamber 19 in FIGURES 3 and 4 and shown in perspective view in FIGURE 8. The float is designed and adapted to be mounted for movement in the chamber 19.

In this form of the invention the float is specially constructed so as to be resistant to collapse in the event that the flow meter be used to accommodate fluids where the pressure is excessive. In order to accomplish this, the float 30 is of segmented construction and consists of a series of separate closed cylindrical tubes 31 arranged in an arcuate pattern, as clearly shown in FIGURES 4 and 8, the tubes being attached together along adjacent portions of their circumferences by weld lines 32. Arcuate plates 33 and 34 are shown as a means of closing the ends of the cylindrical tubes so that the interior of each tube is a separate compartment. The corrugated effect on the exterior gives the float appreciable strength and resistance to compression and the assembly is stiffened and strengthened appreciably by the weld lines and the arcurate plates.

A pivot shaft 35 extends axially through the endmost tube 31 on one side of the float and is anchored non-rotatably to the float so that as the float changes its position with a varying of the density of the fluid passing through the chamber, the pivot shaft will be rotated. In order to mount the pivot shaft and hence the float, the pivot shaft extends through a bushing 36 in the partition wall 28, as shown in FIGURE 3, and extends from the bushing through a hole 37 of ample clearance into the orifice recess 21. At its opposite end the pivot shaft is journalled in a disc 38 which is secured to the partition wall 28 by means of studs 39 drawn against spacing sleeves 40.

Orifice Assembly

Figure 5:
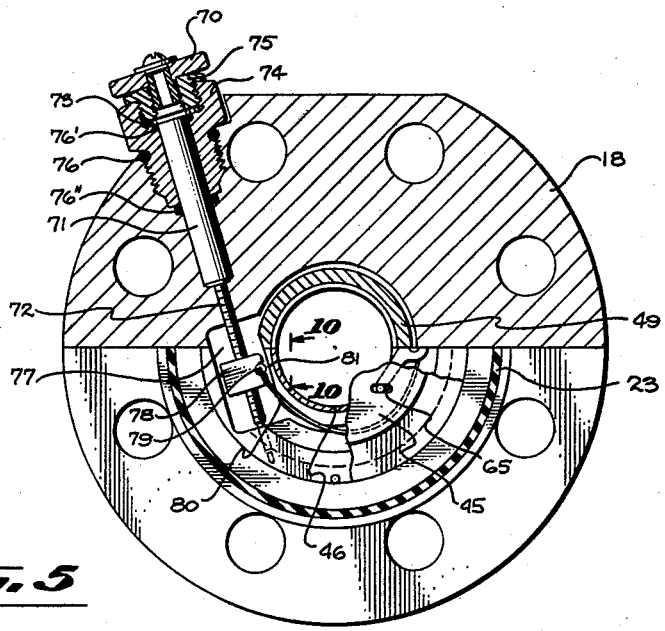
FIGURE 5 is a cross-sectional view taken on the line 5—5 of FIGURE 2.
Figure 9:
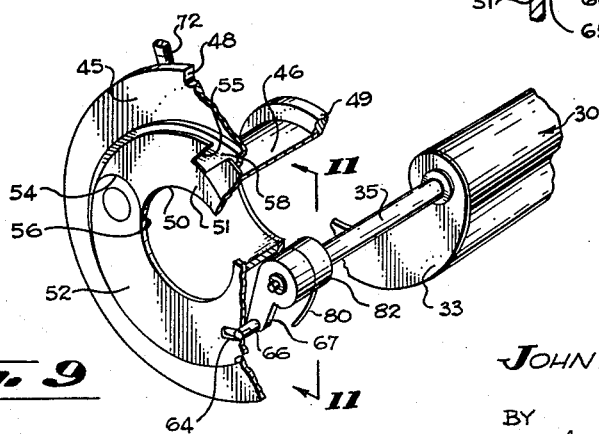
FIGURE 9 is a side perspective view partially broken away and showing the connection between the actuator and the orifice assembly.

The sundry parts of the ordifice assembly are shown in section in FIGURES 2 and 3 and in elevation in FIGURES 5 and 6, FIGURE 9 being employed to show the relationship of the orifice assembly to the float 30.

For mounting the functional parts of the orifice there is provided a sleeve ring consisting of a flange 45 on which is a sleeve 46. The flange is mounted between adjacent faces of the intermediate section 18 and the end section or cover fitting 20 where it is secured against rotation by means of pins 47 fitting in notches 48. The sleeves 46 seats in a ring bushing 49 and together provides a passageway through the orifice recess 21. In the flange 45 a central orifice opening 50 somewhat greater in area than the controlling variable orifice which is subject to control by the float 30.

The orifice here described is an orifice identified in hydraulic terms as a thin plate orifice because of the special flow characteristics needed in a measuring device of the kind herein disclosed. To form the controlling orifice there is provided a fixed orifice element 51 and a movable orifice element 52. The fixed orifice element may in fact be a raised portion of the flange 45 in order to promote simplicity in construction. The orifice opening 50 previously made reference to extends through the fixed orifice element and as is apparent from an examination of FIGURE 6 is of a somewhat elongated shape which might be described as roughly elliptical. The flange 45 is provided further with an arcuate recess 53, one end 54 of which is semi-circular and the other end 55 of which is straight. The pattern of the recess is such that it breaks into the orifice opening 50 between points 56 and 57. The object in part of this construction is to provide a thin plate variable orifice which will be absolutely flush around the ring of the opening on the upstream side and which will admit of no breaks in the continuity of the rim of the orifice as the movable element moves through the entire range of movement from full open position to full contracted position. It should be borne in mind in this connection that the range of movement of an orifice of the kind here under consideration is not of great magnitude and need not be in order to accommodate the anticipated changes in density of the fluid to be measured. That is to say, the difference between full open position and contracted position is not great with respect to area. It is, however, important that the variability be under very careful control and be capable of progressing by very small increments either toward contracting position or toward opening position, the changes in specific gravity or density being immediately reflected in the positioning of the movable element of the orifice.

To achieve the end indicated, the movable orifice element 52 is constructed in an arcuate piece which almost duplicates the size and form of the arcuate recess 53 except for the amount of adjustment provided which is indicated by a space 58 in FIGURE 6 between the end 55 of the recess and a straight edge 59 at the free end of the movable element. The movable element is pivotally mounted upon the fixed element by means of a flush rivet 60 at the opposite end where an arcuate edge 61 fits snugly and rotatably within the arcuate end 54 of the fixed orifice element.

Attention is expressly directed to the curvature of an arcuate side edge 62 of the movable element which varies in a distinct fashion so as to coincide precisely with an arcuate side edge 63 of the fixed orifice element throughout a portion near the free end of the movable element. As the arcuate side edge 62 approaches the pivot end or fixed end of the movable element, the curvature varies appreciably to one which is substantially of the same radius as the orifice opening 50. The arcuate side edge 62 is so calculated that, as is apparent from the position of the parts in FIGURES 6 and 7, the arcuate side edge 62 will always be tangent to both the perimeter of the orifice opening 50 at the point 57 and the curvature of the arcuate side edge 63 of the recess 53. There will be no break at any position of adjustment because of this and hence the perimeter of the orifice opening through the orifice plate will always be continuous in all positions of adjustment and the only discontinuity at the plane of the plate will be the space 58 remote from the orifice opening at expanded positions of adjustment. In practice the form of the side edge 62 and the side edge 63 is that of a radius struck about the flush rivet 60 as a center.

Figure 11:
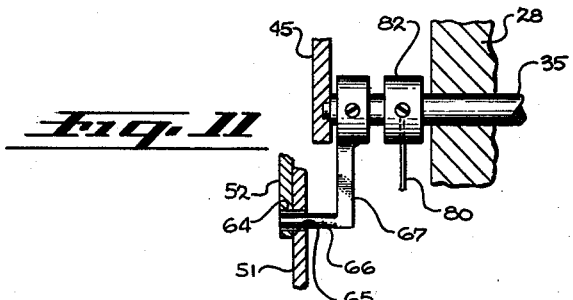
FIGURE 11 is a fragmentary sectional view taken on the line 11—11 of FIGURE 9 showing the connection between the actuator and the orifice assembly.

To actuate the movable element 52, there is provided a slot 64 in the movable element and a slot 65 in the fixed element. The relationship of the slots is clearly shown in FIGURES 6 and 7. A pin 66 fits into both slots which may be described as camming slots, the pin being mounted upon a crank arm 67 non-rotatably attached to the pivot shaft 35, as clearly shown in FIGURES 9 and 11.

As the float 30 raises and lowers in response to a change in density in the fluid passing through the flow meter and into the chamber 19, the movement of the float is in a substantially arcuate direction about the pivot shaft 35 as a center. These movements rotating the pivot shaft are transferred to the movable orifice element 52. The transfer is effected by rotation of the crank arm 67 and the pin 66 thereon, the pin sliding in the slots 65 and 64. From maximum open position, as shown in FIGURE 6, the pin 66 will advance against the upper wall of the slot 64 while sliding freely in the slot 65. Pressure against the wall of the slot 64 of a camming character rotates the movable orifice element 52 clockwise about the center of rotation around the rivet 60 toward the maximum contracted position of FIGURE 7 where the pin 66 bottoms against the opposite end of the slot 64. In reverse direction the pin by pressing against the opposite side of the slot 64 as it passes freely through the slot 65 shifts the movable orifice element 52 in a counterclockwise direction, thereby progressively enlarging the orifice opening 50.

Zero Adjustment

To provide a degree of versatility to the flow meter in order that it may accommodate different types of liquids under different rates of flow at different pressures, it becomes desirable to change the initial setting of the movable orifice element 52, thereby to establish a maximum opening condition which may be different from that illustrated in FIGURE 6. This is accomplished in the main by manipulation of a handle 70 on the exterior of the housing, as shown in FIGURE 5. By employment of the mechanism forming a connection between the handle 70 and the pivot shaft 35, a completely altered initial setting of the variable orifice can be achieved from the outside without it being necessary to disassemble the device in any manner whatsoever. The handle 70 is non-rotatably attached to a rotating shank 71 which has a screw 72 at its inner end. The shank is provided with a flange 73 at its outer end retained in a fitting 74 by means of a nut 75. Engagement of the nut with the flange 73 provides a rotating seal for the shank 71 so that though permitting free rotation, there can be no escape of fluid which is under pressure in the device. Seal rings 76 and 76', 76" provide additional means for sealing the pressure in at the area of the external zero adjustment.

Adjacent the inner end of the screw 72 there is provided an enlargement 77 of the orifice recess 21 to accommodate a block 78 which threadedly engages the screw 72. Carried by the clock is an anchor pin 79 for a spring extension 80. The anchor pin is movable with respect to the block 78 and carries on it a projection 81 which extends through an appropriate opening in the ring bushing 49, as shown in FIGURES 3 and 5. The spring extension 80 extends around the exterior of the orifice opening 50 into engagement with a collar 82 non-rotatably mounted upon the pivot shaft 35, as shown in part in FIGURES 3 and 5. Inasmuch as the spring extension is securely attached to the collar, it will be evident that as the handle 70 is rotated in one direction or another, the block 78 will move correspondingly up or down. When the block moves up, the spring extension will draw upon the collar 82 and tend to rotate the pivot shaft 35 in a clockwise direction, as viewed in FIGURE 5. This will tend to move the crank arm 67 and pin 66 likewise in a clockwise direction, the effect of which will be to rotate the movable orifice element 52 in a counter-clockwise direction and hence contract the orifice opening 50 to a corresponding degree. Contrarily, when the block 78 is moved downwardly, opposite rotation of the pivot shaft 35 and crank arm 67 will through the agency of the pin 68 rotate the movable orifice element 52 in a clockwise direction, as viewed in FIGURE 6, and accordingly enlarge the orifice opening 50 to a corresponding degree.

Handling of Fluid Flow

It will be clear from an examination particularly of FIGURE 3 that there is a clear and unobstructed passage for fluid from the inlet connection 11 through the outlet connection 14, except for the presence of the variable thin plate orifice. This clear and unobstructed passage is achieved by virtue of placing all of the operating parts around a space exterior with respect to the flow passage. This placing includes the placing of the arcuate float 30 and its pivot shaft, the crank arm which moves the movable orifice element and the zero setting mechanism. To a further degree the flow path is defined not only by the inlet and outlet passages 25 and 27 and the axial bore 26, but also by the sleeve 45. In addition there is provided a tube 85 which extends centrally through the chamber 19 and separates the chamber into a central flow-away 86 intermediate inlet and outlet passages and a pocket 87 surrounding the tube 85. The pocket may be appropriately described as a float pocket for the retention of a portion of the fluid passing through the device for actuation of the float. To prevent surging of the float due to abrupt temporary changes in density, it is desirable to prevent a surging within the pocket 87. To accomplish this, the tube 85 is made of porous walled construction by appropriate conventional and well-known means whereby the porosity of the wall can be controlled to a particularly fine degree. Constructed in this fashion, even though high pressures may be encountered in fluid lines, the flow of the fluid from the central passageways into the pocket 87 will be retarded sufficiently to prevent sudden temporary changes in pressure in the pocket and thus dampen action of the actuator embodied in the float. The tube 85 is securely retained in position by employment of the disc 38 previously described, held in position against the end of the tube by means of the studs 39. The float 30 is made of such dimension that it will clear the exterior of the tube 85 by an amount sufficient to permit the desired amount of movement brought about by maximum changes in the density encountered.

Because of the damping effect in the pocket 87, there may under some circumstances be a tendency for fluid therein to, in effect, stagnate and as a consequence not immediately reflect changes in the density of fluid flowing through the device. To obviate this, there is provided a purge passage 90 which serves as a purge or vent for the pocket 87. The purge passage communicates with an annular recess 91 which in turn is assured of a free flow of fluid through openings 92 through the disc 38. Since the purge passage 90 is directed angularly into the outlet passage 25 it will tend to create a suction and induce flow in the first instance through the wall of the tube 85 into the pocket 87 and thence outwardly through the purge passage 90.

Inasmuch as measuring is accomplished by making use of differential pressure across the thin plate orifice, the passage of fluid must be tapped on opposite sides of the orifice. This is accomplished by providing one gage connection 93 on the upstream side of the orifice and another gage connection 94 on the downstream side of the orifice in the area of the vena contracta. The pressure drop created by the interposition of the orifice will be reflected in the pressures at these points which may be connected by means of fittings 95 and 96 shown in FIGURE 1 in conventional fashion to a suitable gage, thereby to measure the differential pressure. Unions 97 and 98 on the opposite side communicating through bores 99 and 100 to the interior at appropriate locations may also be provided. Inasmuch as the orifice is changed in the manner described by changes in the density of the fluid, the differential pressure will likewise change and this change will be immediately reflected in the gage reading. Moreover, by building into the device assurances against variations which may inadvertently make gage reading difficult such, for example, as providing a clear flow through the device, damping the float pocket, and purging the same, dependable readings can be made for very slight deviations in the density of fluid continuously passing through the meter. The structural refinements, as heretofore described, have been streamlined and compact so as to be adequately housed within a housing of relatively small dimension and further evidence a construction such that the device can be simply and inexpensively made without sacrificing the high precision requirements.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A mass flow meter comprising a housing having an axially disposed chamber therein, an end wall having an outlet passage and a partition wall having an inlet passage, an orifice recess outside said partition wall and a cover fitting over the recess having an axial bore therethrough in communication with said recess, a tube having passage means in the wall thereof extending axially through the chamber dividing said chamber between a flow line from the inlet passage to the outlet passage and a pocket surrounding said tube, a density responsive member rotatably mounted in said pocket for movement arcuately about the axis of said tube, a thin plate orifice assembly mounted on said housing having a fixed element and a movable element forming a variable orifice and a connection between the density responsive member and the movable element operable in response to movement of said density responsive member whereby to vary the orifice size in proportion to density changes in the fluid in said chamber.

2. A mass flow meter comprising a housing having an axially disposed chamber therein, an end wall having an outlet passage and a partition wall having an inlet passage, an orifice recess outside said partition wall and a cover fitting over the recess having an axial bore therethrough in communication with said recess, an orifice sleeve extending through said recess in communication between said bore and said inlet passage, and a flange on the sleeve confined rotatably between the cover fitting and the housing, a tube having passage means in the wall thereof extending axially through the chamber dividing said chamber between a flow line from the inlet passage to the outlet passage and a pocket surrounding said tube, a density responsive member rotatably mounted in said pocket for movement arcuately about the axis of said tube, a thin plate orifice assembly mounted on said flange having a fixed element and a movable element forming a variable orifice and a connection between the density responsive member and the movable element operable in response to movement of said density responsive member whereby to vary the orifice size in proportion to density changes in the fluid in said chamber.

3. A mass flow meter having a housing, connections at opposite ends of the housing for a fluid line, and a chamber in said housing the combination of a partition in the chamber having a flow passage therethrough of diameter less than the diameter of said chamber, a tube in axial alignment therewith and extending through the chamber forming a continuation of said flow passage, said tube defining a pocket in the chamber exterior of the tube, a float assembly including a float member in said pocket lying outside said flow passage and having an arcuate shape in cross-section of a radius of curvature not less than the radius of curvature of said tube, a pivot shaft attached to one side of said float and pivotally mounted in said partition outside the circumference of said passage, an orifice plate across said passage having an orifice therethrough and including a movable element, and a crank arm connecting said movable element with said pivot shaft and located outside the circumference of said passage whereby to enable an unobstructed clear flow of fluid through said passage in all positions of adjustment of said variable orifice plate and said float assembly.

4. A mass flow meter having a housing, connections at opposite ends of the housing for a fluid line, and a chamber in said housing the combination of a partition in the chamber having a flow passage therethrough of diameter less than the diameter of said chamber, a tube in axial alignment therewith and extending through the chamber forming a continuation of said flow passage, said tube defining a pocket in the chamber, means forming openings in the wall of said tube in communication between said flow passage and said pocket, a purge passage through the housing in communication between the pocket and the connection on the downstream side of the housing, a float assembly including a float member in said pocket lying outside said flow passage, a pivot shaft attached to one side of said float and pivotally mounted in said partition, an orifice plate across said passage having an orifice therethrough and including a movable element, and a crank arm connecting said movable element with said pivot shaft.

5. A mass flow meter having a housing, connections at opposite ends of the housing for a fluid line, and a chamber in said housing the combination of a partition in the chamber having a flow passage therethrough of diameter less than the diameter of said chamber, a tube extending through the chamber forming a continuation of said flow passage, said tube defining a pocket in the chamber, a float assembly including a float member in said pocket lying outside said flow passage, a pivot shaft attached to one side of said float and pivotally mounted in said partition, an orifice plate across said passage having an orifice therethrough and including a movable element, and a crank arm connecting said movable element with said pivot shaft, said tube comprising a porous wall structure forming a damper for passage of fluid from the flow passage into said pocket.

6. A mass flow meter having a housing, connections at opposite ends of the housing for a fluid line, and a chamber in said housing the combination of a partition in the chamber having a flow passage therethrough of diameter less than the diameter of said chamber, a tube of substantially the same diameter as said passage in axial alignment therewith and extending through the chamber forming a continuation of said flow passage, said tube defining a pocket in the chamber exterior of the tube, a purge passage through the housing in communication between the pocket and the connection on the downstream side of the housing, a float assembly including a float member in said pocket lying outside said flow passage and having an arcuate shape in cross-section of a radius of curvature not less than the radius of curvature of said tube, a pivot shaft attached to one side of said float and pivotally mounted in said partition outside the circumference of said passage, a thin plate across said passage having an orifice therethrough and including a movable element, and a crank arm connecting said movable element with said pivot shaft and located outside the circumference of said passage whereby to enable an unobstructed clear flow of fluid through said passage in all positions of adjustment of said movable element and said float assembly, said tube having a porous wall structure forming a damper for passage of fluid from the flow passage into said pocket.

7. In a mass flow meter having a housing, connections at opposite ends of said housing for a fluid line, and a chamber in said housing, the combination of a partition in said chamber having a passage therethrough, a variable thin plate orifice mounted in the passage including a movable element adapted upon movement to vary the size of the orifice, actuating means in the chamber responsive to changes in the condition of fluid flowing therethrough and operably connected to the movable element adapted to shift the movable element to different positions in response to said changes, and means for varying the zero setting of said movable element comprising a handle on the exterior of the housing and a rod thereon extending into the housing, a rotational shaft in the housing for said actuating means, a connection between the shaft and the movable element of the orifice adapted to vary the position of said movable element in response to rotation of said shaft, and a connection between said rod and said shaft whereby to enable a change in the zero setting in response to adjustment of said handle.

8. In a mass flow meter having a housing, connections at opposite ends of said housing for a fluid line, and a chamber in said housing for the fluid line, the combination of a partition in said chamber having a passage therethrough, a variable thin plate orifice mounted in the passage including a movable element adapted upon movement to vary the size of the orifice, actuating means in the chamber responsibe to changes in the condition of fluid flowing therethrough and operably connected to the movable element adapted to shift the movable element to different positions in response to said changes, and means for varying the zero setting of said movable element comprising a handle on the exterior of the housing and a rod thereon extending into the housing, a rotational shaft in the housing for said actuator, a connection between the shaft and the movable element of the orifice adapted to vary the position of said movable element in response to rotation of said shaft in all positions of said movable element, and a flexible connection between said rod and said mounting shaft whereby to enable a change in the zero setting in response to adjustment of said handle.

9. In a mass flow meter having a housing, connections at opposite ends of said housing for a fluid line, and a chamber in said housing, the combination of a partition in said chamber having a passage therethrough, a sleeve ring rotatably mounted in said passage, a variable thin plate orifice assembly mounted in the passage including an orifice therethrough and a movable element adapted upon movement to vary the size of the orifice, actuating means in the chamber responsive to changes in the condition of fluid flowing therethrough and operably connected to the movable element adapted to shift the movable element to different positions in response to said changes, and means for varying the zero setting of said movable element comprising a handle on the exterior of the housing, a rod thereon extending into the housing, a connecting linkage between the rod and the sleeve ring movable in response to movement of said rod, a rotational shaft in the housing for said actuator extending to a location adjacent the ring, a camming connection between the shaft and the movable element of the orifice adapted to vary the position of said movable element in response to rotation of said shaft, and a flexible connection between said connecting linkage and said shaft whereby to enable a change in the zero setting in response to adjustment of said handle.

10. A mass flow meter having a housing, connections at opposite ends of the housing for a fluid line, and a chamber in said housing the combination of a partition in the chamber having a flow passage therethrough of diameter less than the diameter of said chamber, a tube in axial alignment with the passage and extending through the chamber forming a continuation of said flow passage, said tube defining a pocket in the chamber, means forming openings in the wall of said tube in communication between said flow passage and said pocket, a float assembly including an elongated float member in said pocket extending around the exterior of said flow passage and a pivot shaft attached to one side of said float member and pivotally mounting said float member in said partition, said float member comprising a plurality of substantially cylindrical separate closed tubes grouped in an arcuate arrangement and joined together along adjacent contacting lines at the circumference whereby to form a unitary float member having a corrugated exterior resistant to pressure.

11. In a mass flow meter having a housing, connections at opposite ends of the housing for a fluid line, and a chamber in said housing the combination of a partition in the chamber having a flow passage therethrough of diameter less than the diameter of said chamber, a tube of substantially the same diameter as said passage in axial alignment therewith and extending through the chamber forming a continuation of said flow passage, said tube defining a pocket in the chamber exterior of said tube, means forming openings in the wall of said tube in communication between said flow passage and said pocket, a float assembly including a float member in said pocket lying outside and said flow passage and a pivot shaft attached to one side of said float member and pivotally mounting said float member on said partition, a thin plate variable orifice plate across said passage having an orifice therethrough and including a movable element, and a crank arm connecting said movable element with said pivot shaft, said float member comprising a plurality of substantially cylindrical separate closed tubes grouped side by side in an arcuate arrangement and joined together along adjacent contacting lines at the circumference whereby to form a unitary float member having a corrugated exterior resistant to pressure.

12. A mass flow meter comprising a housing having a chamber and axially aligned inlet and outlet openings and walls defining a cylindrical surface extending from the inlet opening through the chamber and to the outlet opening, the generatrix of said cylindrical surface being a straight line throughout the extent of said cylindrical surface, a density responsive means rotatably mounted in said chamber for movement arcuately about the exterior of said cylindrical-surface-defining walls, a thin plate orifice assembly extending transversely of said cylindrical surface and having a fixed element and a movable element forming a variable orifice within said cylindrical surface, and a connection between the density responsive member and the movable element operable in response to movement of said density responsive member to vary the orifice size in proportion to density changes in the chamber.

References Cited in the file of this patent

UNITED STATES PATENTS

| | | |
|---|---|---|
| 302,622 | Coffee | July 29, 1884 |
| 459,919 | Tilghman | Sept. 22, 1891 |
| 1,677,834 | Linderman | July 17, 1928 |
| 2,402,585 | Allison | June 25, 1946 |